: 2,955,106
Patented Oct. 4, 1960

2,955,106

PROCESS OF DEASHING POLYMERS WITH MIXTURE OF DIACETONE ALCOHOL AND A LOWER ALKANOL

John R. Lovett, Metuchen, N.J., assignor to Esso Research and Engineering Company, a corporation of Delaware No Drawing. Filed Mar. 7, 1958, Ser. No. 719,726

7 Claims. (Cl. 260—93.7)

This invention relates to an improved method of removing ash from low pressure hydrocarbon polymers. More particularly it relates to a process of this nature utilizing diacetone alcohol as the deashing agent.

The low pressure polymerization and copolymerization of alpha olefins and diolefins with catalyst systems made up of a partially reduced, heavy transition metal halide and a reducing metal-containing compound to high density, often isotactic, high molecular weight, solid, relatively linear products has been assuming ever increasing importance and is now well known. One of the problems in these low pressure polymers is the ash content caused principally by the catalyst systems utilized. The potential ash content varies depending upon the catalyst efficiency obtained in the polymerization but generally ranges from about 3.0 to 0.5 wt. percent as determined by a fusion technique (dry ash). It has been observed that polymers with ash contents greater than about 0.05 wt. percent discolor badly during processing and tend to corrode the metals commonly used in processing equipment. For this reason reduction of the ash content to less than 0.05 wt. percent is essential in order to produce a commercially desirable product.

This invention provides an improved method of removing ash from the polymers discussed. The method comprises washing out the catalyst residues contained in the polymerization mixture with small amounts of diacetone alcohol (4-hydroxy-4-methyl-2-pentanone) to reduce the content to the desired level.

It is especially surprising to find that diacetone alcohol works in the manner indicated. Other monocarbonyl compounds, e.g. acetone, are just about ineffective and it had been found necessary to use dicarbonyl compounds. The latter, however, are quite expensive and result in increasing the cost of the process.

For the purpose of convenience details of the low pressure catalytic process and the products obtained thereby are presented below, although it should be realized that these constitute no part of this invention.

The alpha olefinic feeds utilized in polymerization and copolymerization include ethylene, propylene, butene-1, heptene-1, dodecene-1, etc. with ethylene and propylene preferred.

Among the diolefins that can be used in copolymerization include butadiene, isoprene, piperylene, vinylcyclohexene, cyclopentadiene, 1,4-pentadiene, etc. It is to be understood that wherever the term "polymer" is used herein, it connotes both homo- and copolymers.

The process is described in the literature, e.g. see Belgian Patent 538,782 and "Scientific American," Sept. 1957, pages 98 et seq.

In that process the polymers are prepared by polymerizing the constituent monomers in the desired proportions with the aid of certain polymerization catalysts, e.g., see above-mentioned Belgian patent. The catalysts are solid, insoluble reaction products obtained by partially reducing a reducible, heavy transition halide of a group IV-B to VI-B or VIII metal of the Mendeleef Periodic Table, etc. with a reducing group I to III metal containing material such as an organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared by reducing 1 mole of titanium tetrahalide, usually tetrachloride, to the corresponding trivalent or sub-trivalent titanium halide with about 0.2 to 6 moles of aluminum triethyl, triisobutyl or other aluminum alkyl compound of the formula RR'AlX. In this formula R, R' and X preferably are alkyl groups of 2 to 8 carbon atoms, although X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 moles of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of the same or differing inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a lower, i.e., $C_1$ to $C_8$ alkanol such as methyl alcohol or isopropyl alcohol is normally added to the reaction mixture for the purpose of partially dissolving and deactivating the catalyst and for precipitating the polymer product from solution. The alcohol alone does not remote sufficient ash to afford a desirable product. After filtration, the solid polymer may be further washed with alcohol or acid such as hydrochloric acid, dried, compacted and packaged.

The polymers produced have molecular weights in the range of about 100,000 to 300,000 or even as high as 3,000,000 as determined by the intrinsic viscosity method using the I. Harris Correlation (J. Polymer Science, 8 361, 1952). The polymers can have a high degree of crystallinity and a low solubility in n-heptane.

It is to be understood that the term "low pressure" polymer as used herein connotes material prepared in the indicated manner.

The amount of diacetone alcohol utilized in the process of this invention is not critical. In general the range is from 0.5 to 4 moles of diacetone alcohol per mole of potential catalyst residues. The temperature of treatment is conveniently in the range of about 25° to 80° C., with a time interval in the range of about 5 minutes to 24 hours. The washing operation of this invention is preferably caried out employing a high degree of agitation such as is obtained with conventional commercial stirring apparatus. Very effective washings of polymeric products in accordance with the present invention are obtained when the washings are carried out in an inert atmosphere such as nitrogen. In general, the washing operation is carried out in a non-aqueous medium.

The washing or washings can take place prior to the filtration or other separation of the polymers or subsequent thereto. In both cases the diacetone alcohol can be utilized alone or in combination with other washing agents such as the alkanols. The washing step can also, if desired, be carried out in the presence of an inert hydrocarbon diluent such as, for example, saturated aliphatic hydrocarbons containing 1 to 10 carbon atoms, such as hexane and heptane. Other hydrocarbon diluents which may be employed include benzene, toluene, petroleum mineral oils and cyclohexane.

This invention and its advantages will be better understood by reference to the following examples.

EXAMPLE 1

Polypropylene having a molecular weight of about 150,000 was prepared utilizing a preformed $$TiCl_3—0.2AlCl_3$$

catalyst (prepared from aluminum and $TiCl_4$) with aluminum triethyl as the activator. The theoretical ignition ash content was 0.7 wt. percent. The polymer slurry obtained was treated under a $N_2$ atmosphere with diacetone alcohol and 1/25 of the precipitating volume of isopropanol. After the mixture was allowed to stand for more than 20 minutes an equal volume of isopropanol was added. The mixture was stirred and filtered. The deashing agent used was technical grade diacetone alcohol. The results are presented below:

| Moles of Diacetone Alcohol/Metal | Ash Weight Percent [a] (total ash) |
| --- | --- |
| 4/1 | 0.045 (0.042) (0.038) |

[a] The values in parenthesis are for other polymers produced with the same catalyst and catalyst amounts and deashed identically.

The tremendous reduction in ash content is self-evident and need not be amplified. It is of further interest that diacetone alcohol utilized was technical grade and had not been purified in any manner.

EXAMPLE 2

Polypropylene was prepared in the same manner as in the preceding example utilizing $TiCl_3$ obtained by hydrogen reduction of $TiCl_4$ but contained 1.2 weight percent ash. The samples were split into several portions to determine the relative efficacy of diacetone alcohol and acetone in deashing in the same manner as in Example I. Identical deashing conditions were utilized with diacetone alcohol and the acetone. The results are presented below: Table I for acetone and Table II with diacetone alcohol.

Table I

| Quench Liquid | Moles Acetone/ Moles Metal | Ppt. Washed with 2 V | Ash, Wt. Percent |
| --- | --- | --- | --- |
| Acetone in 1/25 ppt. V of iPrOH | 4/1 | iPrOH | 0.084 [a] (0.092) |
| Acetone | 20/1 | iPrOH | 0.160. |
| Acetone | 20/1 | acetone | 0.764. |
| iPrOH (1/25 ppt. V) | | iPrOH | 0.07 [a] (0.095). |

[a] Separate cuts worked up identically.

Table II

| Quench Liquid | Moles Diacetone Alcohol/ Moles Metal | Ash, Wt. Percent |
| --- | --- | --- |
| Diacetone Alcohol+1/25 ppt. V of iPrOH | 1/1 | 0.026 [a] (0.03). |
| Diacetone Alcohol+1/25 ppt. V of iPrOH | 2/1 | 0.03. |

[a] Separate cuts worked up identically.

These results demonstrate the tremendous improvement obtained by the use of diacetone alcohol as compared to acetone. These data indeed indicate that alcohol alone effects removal of more catalyst residues than alcohol containing acetone. This is not true in the case of mixtures of diacetone alcohol and isopropyl alcohol.

The advantages of this invention will be apparent to those skilled in the art. Polymer products of reduced ash content are provided with maximum efficiency and at little cost. The fact that technical grade diacetone alcohol can be used is important on the latter factor.

It is to be understood that this invention is not limited to the specific examples which have been offered merely as illustrations and that modifications may be made without departing from the spirit of the invention.

What is claimed is:

1. A method of removing ash from an alpha olefin solid, hydrocarbon polymer prepared with a heavy metal catalyst formed by admixing an aluminum alkyl with a halide of a group IV–B metal of the periodic system and which comprises contacting the polymerization mixture containing polymer and catalyst residues with diacetone alcohol in an amount of from 0.5 to 4 moles per mole of catalyst residue in conjunction with a $C_1$ to $C_8$ alkanol to solubilize the catalyst residues and removing the resultant solution from the solid polymer.

2. The method of claim 1 in which the polymer is polypropylene.

3. The process of claim 1 in which the alkanol is isopropanol.

4. The process of claim 1 in which the alkanol is methanol.

5. The method of claim 1 in which the temperature of treatment is in the range of about 25° to 80° C.

6. The method of claim 5 in which the time of treatment is in the range of about 5 minutes to 24 hours.

7. A method of removing ash from an alpha olefin solid hydrocarbon polymer prepared with a heavy metal catalyst formed by admixing an aluminum alkyl with a titanium halide, comprising contacting the polymerization mixture containing polymer and catalyst residues with diacetone alcohol, in an amount of from 0.5 to 4 moles per mole of catalyst residue, in conjunction with a $C_1$ to $C_8$ alkanol to solubilize the catalyst residues and then removing the resultant solution from the solid polymer.

References Cited in the file of this patent
UNITED STATES PATENTS

| | | |
| --- | --- | --- |
| 2,843,577 | Friedlander et al. | July 15, 1958 |
| 2,850,488 | Baxter et al. | Sept. 2, 1958 |